United States Patent Office
3,306,938
Patented Feb. 28, 1967

3,306,938
DIALKYLOL ALKYLPHENOL PROCESS
Eldred Welch and David E. Graham, Westfield, N.J., and Abdul Munim Nashu, New Haven, Conn., assignors to General Aniline & Film Corporation, New York, N.Y., a corporation of Delaware
No Drawing. Filed Oct. 8, 1963, Ser. No. 314,620
9 Claims. (Cl. 260—624)

This invention relates to a process for dialkylol alkylphenol manufacture and more specifically it relates to a process for the manufacture of dialkylol alkylphenols of improved color.

It is well known in the art that dialkylol alkylphenols may be prepared by the reaction of alkylphenols with aliphatic aldehydes in either acid or alkaline media. Usually they may be prepared by reacting a 2-alkylphenol or a 4-alkylphenol with an aliphatic aldehyde. Dialkylol alkylphenols prepared by this reaction have many useful applications particularly where a polyhydroxyl compound is required. For example U.S. Patent 2,912,395 describes the use of these phenolic materials as additives to increase the rate of cure of linoleum compositions or to improve the color of the cured linoleum compositions or both. These compounds are also useful particularly when slightly polymerized by heat or an acidic material as a butyl rubber curing agent. These compounds are also useful as resin intermediates. They are also useful as nonionic surfactants (surface active agent) when they are reacted with alkylene oxides in the presence of an alkylamine catalyst as described in the copending application of Welch, Graham, and Wilson, Serial Number 329,997 filed December 12, 1963. Unfortunately, when dialkylol alkylphenols are prepared by the processes described in the prior art, they are too highly colored for use in many applications in which they would otherwise function properly.

It is an object of the present invention to provide a process for the manufacture of dialkylol alkylphenols. Another object of the present invention is to provide an improved process for the manufacture of dialkylol alkylphenols. Still another object of the present invention is to provide a process for the manufacture of dialkylol alkylphenols having lighter colors than those obtained by the processes described in the prior art. Another object of the present invention is to produce lighter color dialkylol alkylphenols. Other objects and advantages of the present invention will appear as this description proceeds.

The attainment of the objects of this invention is made possible by our discovery that the color of dialkylol alkylphenols of the formula:

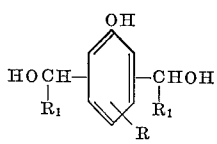

wherein R is an alkyl radical having from 1 to 30 carbon atoms and $R_1$ is a member selected from the group consisting of hydrogen and an alkyl radical having from 1 to 7 carbon atoms obtained by reacting at least 2 moles of an aliphatic aldehyde having at least 1 to 8 carbon atoms with an alkylphenol in a neutralized aqueous suspension to produce the dialkylol alkylphenol, is substantially decreased by adding a small amount of oxalic acid after reaction of the aldehyde with the alkylphenol, to decrease the color of the dialkylol alkylphenol.

We have discovered that the color present in a dialkylol alkylphenol may be greatly reduced by treating the dialkylol alkylphenol in its liquid state with oxalic acid. If the dialkylol alkylphenol is a liquid, it may be treated directly with oxalic acid. If the dialkylol alkylphenol is a solid, it may be converted to its liquid state by heating the dialkylol alkylphenol to above its melting point prior to treatment with oxalic acid. Although the dialkylol alkylphenol may be treated with oxalic acid at any point in the process after the alkylphenol has been completely reacted with the aldehyde, such as after acidification of the dialkylol alkylphenol, after precipitation from the reaction mixture or after the dialkylol alkylphenol has been separated from the reaction mixture, we prefer to add the oxalic acid to the liquid dialkylol alkylphenol after it has been separated from the reaction mixture and contains only a small amount of water. A preferred method of treating the dialkylol alkylphenol with oxalic acid is to add the oxalic acid with stirring to the dialkylol alkylphenol. Most of the color of the dialkylol alkylphenol is reduced after it has been stirred with oxalic acid for a few minutes. It is not known why oxalic acid is effective in decreasing the color of dialkylol alkylphenols but it is possible that the oxalic acid may reduce some of the colored impurities present in the dialkylol alkylphenol and that oxalic acid may also react with the iron compounds which are present in the product that form colored products with dialkylol alkylphenols. However, we do not limit ourselves to any particular theory as to the manner in which oxalic acid operates in this invention to decrease the color of dialkylol alkylphenols. In any event the decreases in color of dialkylol alkylphenols obtained with oxalic acid are particularly surprising because we found that known iron chelating agents such as ethylenediaminetetracetic acid and the monosodium salt of N,N-dihydroxyethylglycine were ineffective in decreasing the color of dialkylol alkylphenols in the process disclosed in this invention.

We also found that it is desirable to use water free of any metal ions that may form insoluble salts with oxalic acid particularly during the process of producing dialkylol alkylphenols and during the washing of liquid dialkylol alkylphenols. Insoluble metal oxalates are difficult to remove from dialkylol alkylphenols because they are not readily dissolved in water and consequently are not removed from dialkylol alkylphenols by washing with water. Removal of insoluble oxalates from fluid dialkylol alkylphenols by filtration is usually not practical because of the high viscosity of the dialkylol alkylphenols. When a clear dialkylol alkylphenol product free of solids such as insoluble oxalates is desired, it is important to use process water that has been treated with the sodium salt of an ion exchange resin or distilled water particularly if the natural water available for process purposes contains cations such as magnesium, calcium and other metal ions which will form insoluble oxalates. The presence of these metal cations in the water will not inhibit the decolorizing action of the oxalic acid on dialkylol alkylphenols but these cations will form insoluble oxalates in the alkylol alkylphenol which will produce a turbid product.

Briefly, the process for dialkylol alkylphenol manufacture of this invention involves neutralizing an aqueous dispersion of an alkylphenol having at least one carbon atom in an alkyl radical with a metal hydroxide, reacting at least two moles of an aliphatic aldehyde having at least one carbon atom with the alkylphenol suspension to produce the desired dialkylol alkylphenol, precipitating the dialkylol alkylphenol by acidification, separating the dialkylol alkylphenol from the reaction mixture, drying the dialkylol alkylphenol and at a point after complete reaction of the alkylphenol with the aldehyde adding a small amount of oxalic acid to decrease the color of the dialkylol alkylphenol and to produce a lighter color dialkylol alkylphenol than was previously obtained by the prior art.

Alkylol alkylphenols are generally prepared by reacting a 2-alkylphenol or a 4-alkylphenol with the required amount of aliphatic aldehyde that will give the desired alkylol alkylphenol. For example, when a dialkylol alkylphenol is desired, the theoretical molar ratio of aldehyde to phenol is 2:1. It may be necessary in practice to use molar ratios of aldehyde to alkylphenol in excess of this theoretical ratio to assure complete reaction. If complete reaction is not obtained with ratios slightly in excess of the theoretical molar ratio, higher molar ratios of aldehydes to phenols should be used. Higher ratios are required when a particular aldehyde does not react readily with the alkylphenol.

Reaction between the alkylphenol and aldehyde is usually carried out in the presence of a metal hydroxide such as sodium hydroxide, barium hydroxide or the like. The reaction mixture of alkylphenol, aldehyde and metal hydroxide as reacted at a temperature preferably between 25 and 60° C. Reaction under these conditions will produce the dialkylol alkylphenol as a monomer. If temperatures lower than these are used, reaction rates are much slower and may not be satisfactory for many commercial purposes. If temperatures higher than these are used, aldehyde alkylphenol polymers are formed and the yield of the desired dialkylol alkylphenol monomer is reduced. Usually the dialkylol alkylphenol is isolated from the reaction mixture by acidification and separated from the mixture as a solid or oily liquid. The dialkylol alkylphenol is washed with water after its separation from the reaction mixture to remove inorganic salts and dried under vacuum. Often it is desirable during drying under vacuum to warm the dialkylol alkylphenol to improve water vaporization and removal. However, the dialkylol alkylphenol should not be warmed during drying to temperatures at which polymerization of the monomer may occur as polymerization will reduce the yield of dialkylol alkylphenol.

The reaction between the alkyphenol and aldehyde is generally carried out by adding sufficient metal hydroxide to an aqueous dispersion of the alkylphenol to form a metal salt of the alkylphenol. Metal hydroxides which may be used include alkali metal hydroxides such as sodium hydroxide and alkaline metal hydroxides such as barium hydroxide.

Alkylphenols which may be used in the process disclosed in this invention include alkylphenols containing at least 1 carbon atom in an alkyl radical of phenolic compounds chosen from the group consisting of 2-alkylphenols and 4-alkylphenols. As examples of specific alkylphenols which may be used there may be mentioned: o-cresol, p-cresol, 2-ethylphenol, 4-ethylphenol, 2-n-propylphenol, 2-i-propylphenol, 4-n-propylphenol, 4-i-propylphenol, 2-n-butylphenol, 2-t-butylphenol, 4-t-butylphenol, 4-s-butylphenol, 4-n-amylphenol, 4-t-amylphenol, 2-s-hexylphenol, 4-n-hexylphenol, 2-n-heptylphenol, 4-s-heptylphenol, 4-n-actylphenol, 2-diisobutylphenol (2-t,t-octylphenol), 4-diisobutylphenol (4-t,t-octylphenol), 4-n-nonylphenol, 4-s-nonylphenol, 2-n-dodecylphenol, 4-n-dodecylphenol, 2-s-dodecylphenol, 4-s-dodecylphenol, 4-octadecylphenol, 4-docosylphenol, 4-tricosylphenol, their isomers or their mixtures.

It will be understood that in addition to the above mentioned examples that commercial alkylphenols may also be used. Such commercial alkylphenols may be predominantly 2-alkylphenols, 4-alkylphenols or mixtures of these alkylphenols depending on the particular commercial alkylation process used for their manufacture.

Numerous methods for preparation of these alkylphenols and descriptions of their properties may be found in patents and other publications. Alkylphenols useful in the process disclosed in this invention may be obtained by alkylation of phenol with olefins containing from 2 to 5 carbon atoms such as ethylene, propylene, butylene, amylene, isomers of these olefins or their mixtures. These lower molecular weight olefins may be polymerized to obtain polyolefins which also may be used in the manufacture of alkylphenols for use in this invention. Such polyolefins may be $\alpha$-olefins of the type obtained by condensing ethylene in the presence of Ziegler type catalysts to obtain straight chain type olefins. Straight chain $\alpha$-olefins obtained by wax cracking of fats and petroleum products may also be used. Branched chain polyolefins such as propylene dimer, propylene trimer, propylene tetramer, propylene pentamer, isobutylene dimer, isobutylene trimer, isobutylene tetramer, amylene dimer, amylene tetramer or the like may be used.

Aliphatic aldehydes useful in the process disclosed in this invention include aldehydes such as methanal (formaldehyde), ethanal (acetaldehyde), propanal, butanal, isobutanal, pentanal, hexanal, heptanal, octanal, their isomers or their mixtures.

The time required for reaction of metal alkyl phenates with aldehydes to produce dialkylol alkylphenols may vary from 72 to 2 hours at 25 to 65° C. Temperatures in the range of 55 to 65° C. and reaction times of 3 to 6 hours are preferred.

As indicated above a preferred method for treating dialkylol alkylphenols with oxalic acid to decolorize the dialkylol alkylphenol is to add the oxalic acid with stirring to the dialkylol alkylphenol. Although solid oxalic acid in its anhydrous form may be added to liquid dialkylol alkylphenols which contain a small amount of water and the oxalic acid will dissolve in the water present in the phenol, it is generally preferable to add the oxalic acid in the form of an aqueous solution. Saturated solutions of oxalic acid may be used but since these solutions do not offer any particular advantage, we prefer to use more dilute oxalic acid solutions. The concentration of oxalic acid in the solution is largely a matter of choice. As little as 0.01% oxalic acid based on the weight of the dialkylol alkylphenol treated results in a noticeable decrease in color of the dialkylol alkylphenol. A maximum decrease in color is usually obtained with from 0.025 to 0.5% by weight of oxalic acid. Larger amounts of oxalic acid up to 2 to 5% by weight are without adverse effect but usually result in little if any further decrease in color and therefore are not economical. The actual quantity of oxalic acid required will usually depend on the particular dialkylol alkylphenol homologue being decolorized and the degree of decolorization of the dialkylol alkylphenol required or desired.

One preferred point in the process at which the oxalic acid solution may be added is after the alkylphenol has been separated from the reaction mixture and still contains only a small amount of water. This point has the advantage that oxalic acid treatment of only limited quantities of fluids is required whereas treatment of much larger quantities of fluids is required when the oxalic acid solution is added to the reaction mixture prior to separation of the dialkylol alkylphenol layer from the water layer. Generally, a preferred method of treating the dialkylol alkylphenol with oxalic acid solution is to add the solution with stirring to the dialkylol alkylphenol.

Usually, the dialkylol alkylphenol is decolorized by stirring with the oxalic acid solution for a few minutes at from about room temperature to 100° C.

Dialkylol alkylphenol homologues which may be prepared by the process disclosed in this invention include phenolic compounds such as 2,4-dimethylol-6-methylphenol (2,4-dimethylol-o-cresol),
2,6-dimethylol-4-methylphenol (2,6-dimethylol-p-cresol),
2,6-diethylol-4-ethylphenol,
2,6-dipropylol-4-propylphenol,
4,6-dibutylol-2-butylphenol,
2,6-dibutylol-4-butylphenol,
2,6-dipentylol-4-ethylphenol,
2,6-dipentylol-4-pentylphenol,
2,4-dibutylol-6-pentylphenol,
2,6-dihexylol-4-hexylphenol,
2,6-dihexylol-4-octadecylphenol,
2,6-diheptylol-4-heptylphenol,
2,6-diheptylol-4-tricosylphenol,
2,6-dioctylol-4-octylphenol,
2,4-dimethylol-6-dodecylphenol,
2,6-dimethylol-6-octadecylphenol,
2,6-diethylol-4-tricosylphenol, their isomers or their mixtures. It will be undesrtood that if the dialkylol alkylphenols are prepared from commercial alkylphenols containing mixtures of 2-alkylphenols and 4-alkylphenols that mixtures of dialkylol alkylphenol isomers will be obtained.

The details of the present invention will be apparent to those skilled in the art from a consideration of the following specific examples of preferred embodiments thereof. These examples are illustrative of this invention and are not to be regarded as limitative. It will be understood that all parts and proportions referred to herein and in the appended claims are by weight unless otherwise indicated.

EXAMPLE 1

Part A (oxalic acid treatment)

Sodium hydroxide solution, 1565 parts which contained 75 parts of sodium hydroxide in 1490 parts of water was charged to a 3-liter flask equipped with an agitator, thermometer and provision for carrying out reactions in an inert atmosphere such as nitrogen. Air in the flask was displaced with nitrogen. 4-nonylphenol, 412.5 parts (1.875 moles) was gradually added with agitation to the sodium hydroxide solution over 2 hours to form the sodium salt of 4-nonylphenol. 4-nonylphenol used in this preparation was a commercial nonylphenol containing less than 1% of 2-nonylphenol and obtained by the alkylation of phenol with propylene trimer. The dispersion of the sodium salt was heated to 50° C. and formalin, 315 parts (4.13 moles) which is equivalent to 124 parts of methanal (formaldehyde) was added with agitation over a 40 to 60 minute period to the aqueous dispersion. The reaction temperature rose to 58° during formalin addition indicating a mild exothermic reaction. The reaction mixture was stirred at 58 to 60° C. for 2½ hours at which time the reaction was found to be complete. Sufficient concentrated hydrochloric acid was added to the reaction mixture to neutralize the sodium salt and to liberate the product as 2,6-dimethylol-4-nonylphenol. The product separated in the form of an oil layer. The aqueous layer was drawn off from the product. Oxalic acid solution, 0.2 part in 5 parts of water was then added with agitation to the oil layer. After a few minutes of agitation, the color of the oil layer became lighter, indicating that the oxalic acid solution had decolorized the oil. The oil was then washed 3 times with 500 parts of tap water. After the third water wash, the oil was found to be neutral to Congo red and brilliant yellow indicator papers. The oil was vacuum dried at 45° C. Analysis showed that the yield of 2,6-dimethylol-4-phenol was almost theoretical. Lovibond color values (1 in. cell) of the decolorized product were:

Red=0.9
Yellow=2.1
Blue=0.3

The product was slightly cloudy due to the presence of insoluble oxalates formed by the reaction of metal salts present in the tap water with the oxalic acid solution.

Part B (comparative)

The process as described in Part A was repeated with the exception that oxalic acid was not added. Lovibond color values (1 in. cell) of the product were:

Red=7.3
Yellow=2.8
Blue=1.1

Part C (comparative)

The process as described in Part B was repeated with the exception that before the neutralization with hydrochloric acid, 6 parts of Versene Fe-3 Specific (41% aqueous solution of the monosodium salt of N,N-dihydroxyethylglycine) was added and the reaction mixture agitated for 5 minutes before neutralization with acid. Lovibond color values (1 in. cell) of the product were:

Red=5.5
Yellow=16.3
Blue=0.4

Part D (comparative)

The process as described in Part C was repeated with the exception that an equivalent amount of the disodium salt of ethylene diaminetetracetic acid was substituted for Versene Fe-3 Specific. Results comparable to those in Part C were obtained.

EXAMPLE 2

Parts A, B, C and D as described in Example 1 were repeated with the exception that distilled water was substituted for tap water. Clear products which had essentially the same color values as in Example 1 were obtained. Comparable results were obtained by using water treated with the sodium salt of an ion exchange resin. This example demonstrated that the use of process water containing no metal ions which will form insoluble oxalates, gives clear products.

EXAMPLE 3

2,6-dimethylol-4-octylphenol was prepared by following the processes described in Parts A and B of Example 2. In this series of experiments, 4-octylphenol, 390 parts, was used instead of 4-nonylphenol, 412.5 parts. Essentially quantitative yields of 2,6-dimethylol-4-octylphenol were obtained in both preparations. The 4-octylphenol used in these experiments contained less than 1% of 2-octylphenol and was obtained by alkylation of phenol with diisobutylene. The products from Parts A and B give the following Lovibond color values (1 in. cell):

| Part | A | B |
|---|---|---|
| Red | 0.7 | 7.0 |
| Yellow | 2.5 | 6.5 |
| Blue | 0.2 | 0.8 |

EXAMPLE 4

2,6-dimethylol-4-t-butylphenol was prepared by the process described in Parts A and B of Example 2 with the exceptions that 4-t-butylphenol, 281 parts was used instead of 4-nonylphenol, 412.5 parts and oxalic acid, 0.15 part in the form of a 3% solution were used. Essentially, quantitative yields of 2,6-dimethylol-4-t-butylphenol were obtained. The products from Parts A and B gave the following Lovibond values (1 in. cell):

| Part | A | B |
| --- | --- | --- |
| Red | 0.7 | 5.4 |
| Yellow | 1.8 | 6.3 |
| Blue | 0.3 | 0.7 |

EXAMPLE 5

The following dialkylol alkylphenol homologues were prepared by the processes described in Parts A and B of Example 2: 2,4-dimethylol-o-cresol, 2,4-butylol-6-ethylphenol, 2,6-dihexylol-4-octadecylphenol and 2,6-diheptylol-4-tricosylphenol. Comparable improvements in Lovibond color values to those in Example 2 were obtained.

This invention has been disclosed with respect to certain preferred embodiments. Other modifications and variations thereof will become obvious to persons skilled in the art. It is to be understood that such modifications and variations are to be included within the spirit and scope of the present invention.

What is claimed is:

1. A process for decolorizing dialkylol alkylphenols of the formula:

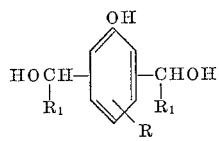

wherein
R is an alkyl radical having of from 1 to 30 carbon atoms, and $R_1$ is a member selected from the group consisting of hydrogen and an alkyl radical of 1 to 7 carbon atoms and produced by the reaction of 2 moles of an aliphatic aldehyde of from 1 to 8 carbon atoms with an alkylphenol having from 1 to 30 alkyl carbon atoms which comprises
adding a small amount of oxalic acid after reaction of the aldehyde with the alkylphenol to decolorize the dialkylol alkylphenol.

2. A process for decolorizing of a dialkylol alkylphenol of the formula

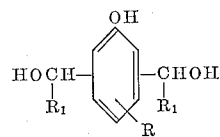

wherein R is an alkyl radical having from 1 to 30 carbon atoms and $R_1$ is a member selected from the group consisting of hydrogen, and an alkyl radical of 1 to 7 carbon atoms which comprises adding to the dialkylol alkylphenol from 0.025 to 0.5% by weight thereof of oxalic acid at from about room temperature to 100° C.

3. A process as defined in claim 1 wherein the dialkylol alkylphenol comprises the reaction product of 2 moles of formaldehyde per mole of mono alkylphenol.

4. A process as defined in claim 1 wherein the dialkylol alkylphenol comprises the reaction product of 2 moles of formaldehyde per mole of mono nonylphenol.

5. A process as defined in claim 1 wherein the dialkylol alkylphenol comprises the reaction product of 2 moles of formaldehyde per mole of mono octylphenol.

6. A process as defined in claim 1 wherein the dialkylol alkylphenol comprises the reaction product of 2 moles of formaldehyde per mole of mono butylphenol.

7. A process as defined in claim 1 wherein the dialkylol alkylphenol comprises the reaction product of 2 moles of acetaldehyde per mole of mono alkylphenol.

8. A process as defined in claim 1 wherein the dialkylol alkylphenol comprises the reaction product of 2 moles of butanal per mole of mono alkylphenol.

9. A process as defined in claim 1 wherein the dialkylol alkylphenol comprises the reaction product of 2 moles of heptanal per mole of mono alkylphenol.

References Cited by the Examiner

UNITED STATES PATENTS 1,720,052  7/1929  Norton _____ 260—59
2,912,395  11/1959  Graham _____ 260—624

LEON ZITVER, *Primary Examiner.*

W. B. LONE, *Assistant Examiner.*